United States Patent
Nakamura et al.

(10) Patent No.: US 7,394,649 B2
(45) Date of Patent: Jul. 1, 2008

(54) SOLID ELECTROLYTIC CAPACITOR WITH AN IMPROVED MOUNTING PROPERTY, AND MANUFACTURING METHOD OF THE SAME

(75) Inventors: Katsuyuki Nakamura, Osaka (JP); Kazuo Kawahito, Osaka (JP); Takahiro Jodoi, Kyoto (JP); Hideto Yamaguchi, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/783,699

(22) Filed: Apr. 11, 2007

(65) Prior Publication Data

US 2007/0242409 A1 Oct. 18, 2007

(30) Foreign Application Priority Data

Apr. 14, 2006 (JP) ............................. 2006-111773

(51) Int. Cl.
*H01G 9/00* (2006.01)

(52) U.S. Cl. ........................ 361/523; 361/540; 29/25.03

(58) Field of Classification Search ................ 361/523, 361/535, 540

See application file for complete search history.

(56) References Cited

U.S. PATENT DOCUMENTS

| 6,891,716 | B2 * | 5/2005 | Maier et al. | ................. 361/523 |
| 2001/0028544 | A1 * | 10/2001 | Sano et al. | ............... 361/301.3 |
| 2005/0146842 | A1 * | 7/2005 | Abe et al. | ................... 361/523 |

FOREIGN PATENT DOCUMENTS

JP 2003-133177 5/2003

* cited by examiner

*Primary Examiner*—Eric Thomas
*Assistant Examiner*—David M Sinclair
(74) *Attorney, Agent, or Firm*—Wenderoth, Lind & Ponack, L.L.P.

(57) ABSTRACT

A solid electrolytic capacitor includes a capacitor element, an anode terminal, a cathode terminal, and an outer casing resin. The anode and cathode terminals constitute parts of the mounting surface, and are drawn immediately below the capacitor element. The anode terminal and the cathode terminal are electrically coupled with an anode leader of the capacitor element and a cathode layer, respectively. The outer casing resin covers the capacitor element, and exposes the anode and cathode terminals on the mounting surface. At least one recess is provided on a mounting surface side of at least one of the anode and cathode terminals having a larger area projected onto the mounting surface.

11 Claims, 7 Drawing Sheets

SOLID ELECTROLYTIC CAPACITOR WITH AN IMPROVED MOUNTING PROPERTY, AND MANUFACTURING METHOD OF THE SAME

BACKGROUND OF THE INVENTION

1. Field of the Invention

The present invention relates to a solid electrolytic capacitor and a manufacturing method of the same.

2. Description of the Related Art

FIG. 7A to FIG. 7C show a configuration of a conventional solid electrolytic capacitor. FIG. 7A is a sectional side view, FIG. 7B is a sectional front view, and FIG. 7C is a bottom view, respectively. FIG. 7A shows a sectional view taken along line 7A-7A of FIG. 7C, and FIG. 7B shows a sectional view taken along line 7B-7B of FIG. 7C.

Capacitor element 61 includes anode body 62, anode leader 63, dielectric oxide film 64, solid electrolyte 65, and cathode layer 66. Anode body 62 is formed of a valve metal foil. Anode leader 63 is provided at one end of anode body 62, and dielectric oxide film 64 is formed on a surface of another end of anode body 62. Solid electrolyte 65 made of a conductive polymer is provided on dielectric oxide film 64. In cathode layer 66, a carbon layer is laminated on solid electrolyte 65, and a silver paste layer is laminated on the carbon layer.

Anode terminal 67 and cathode terminal 68 are formed of metal plates which are made by machining copper lead frames. Anode terminal 67 includes flat portion 70, leading portions 72, and placement portions 74. Flat portion 70 is exposed from outer casing resin 69 at mounting surface 76. Leading portions 72 are bent obliquely upward from both ends of flat portion 70. Placement portions 74 are coupled with a lower surface of anode leader 63. Cathode terminal 68 includes flat portion 71, leading portions 73, and placement portions 75. Flat portion 71 is exposed from outer casing resin 69 at mounting surface 76. Leading portions 73 are bent obliquely upward from both ends of flat portion 71. Placement portions 75 are coupled with a lower surface of cathode layer 66.

Outer casing resin 69 is made of an electrically insulating resin such as an epoxy resin. Outer casing resin 69 covers capacitor element 61 such that anode terminal 67 and cathode terminal 68 are exposed in the same plane with mounting surface 76 in the flat shape.

In the above mentioned configuration, anode terminal 67 and cathode terminal 68 are provided such that anode terminal 67 and cathode terminal 68 are arranged adjacent to each other as close as possible, which shortens a path of current passing through capacitor element 61 from wiring of a circuit board. Therefore, equivalent series resistance (ESR) and equivalent series inductance (ESL) are decreased in the solid electrolytic capacitor. For example, Japanese Patent Unexamined Publication No. 2003-133177 discloses this kind of solid electrolytic capacitor.

The state in which the conventional solid electrolytic capacitor is mounted on the circuit board will be described with reference to FIG. 8. FIG. 8 is a sectional view showing a mounted state of the solid electrolytic capacitor shown in FIG. 7A. Lands 78 are provided in circuit board 77. Lands 78 correspond to positions of anode terminal 67 and cathode terminal 68 which are exposed at mounting surface 76, and lands 78 have shapes substantially similar to those of the terminals. After a solder cream is applied onto lands 78, the solid electrolytic capacitor is placed on lands 78, and the solder is melted by high-temperature reflow to join the solid electrolytic capacitor to circuit board 77. At this point, when an area of cathode terminal 68 in mounting surface 76 is larger than that of anode terminal 67, the melted solder is easily aggregated in a central portion of cathode terminal 68. Therefore, soldering layer 79A on anode terminal 67 differs from soldering layer 79B on cathode terminal 68 in thickness, which sometimes results in a problem that mounting property is impaired such that the solid electrolytic capacitor is mounted while inclined or floating.

SUMMARY OF THE INVENTION

In view of the foregoing an object of the invention is to provide a solid electrolytic capacitor having excellent high frequency properties, in which the mounting property is improved, and a manufacturing method thereof. A solid electrolytic capacitor according to the present invention has a capacitor element, an anode terminal, a cathode terminal, and an outer casing resin. The capacitor element includes an anode body, an anode leader, a dielectric oxide film, a solid electrolyte, and a cathode layer. The anode body is made of a valve metal, the anode leader is provided at one end of the anode body. The dielectric oxide film is formed on a surface of the anode body at a side opposite a side on which the anode leader is provided. The solid electrolyte is formed on the dielectric oxide film, and the cathode layer is formed on the solid electrolyte. The anode and cathode terminals are drawn immediately below the capacitor element to constitute parts of a mounting surface. The anode terminal is electrically coupled with the anode leader, and the cathode terminal is electrically coupled with the cathode layer. The outer casing resin covers the capacitor element, and exposes the anode and cathode terminals from the mounting surface. A recess is provided on the mounting surface side of at least one of the anode terminal and cathode terminal that has a larger area projected onto the mounting surface.

According to the structure, the melted solder flows into the recess during the mounting, the solder thicknesses are equalized on the anode terminal and the cathode terminal, therefore, the mounting property is improved in the solid electrolytic capacitor. Furthermore, the conductivity with the circuit board is not impaired because contact areas between the anode terminal and/or the cathode terminal and the circuit board are increased by the recess. Accordingly, the high-frequency properties of the ESR and ESL properties of the solid electrolytic capacitor are improved as well as the mounting property.

DESCRIPTION OF THE PREFERRED EMBODIMENT

Figure 1A:
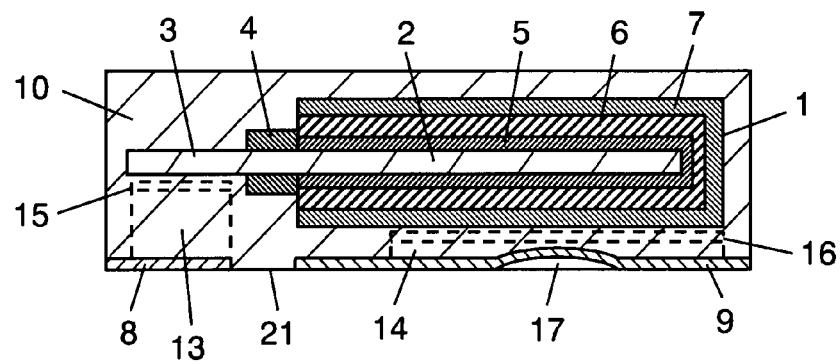
FIG. 1A is a side sectional view of a solid electrolytic capacitor according to an exemplary embodiment of the present invention.
Figure 1B:
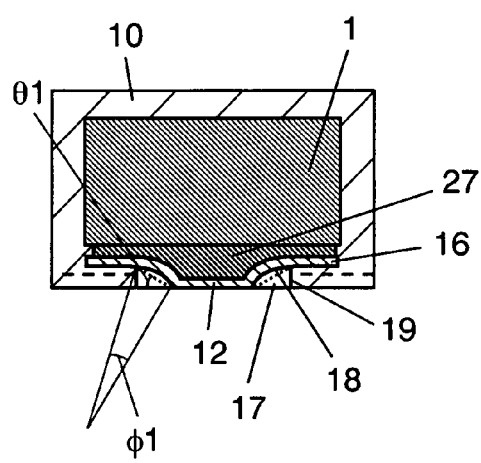
FIG. 1B is a front sectional view of the solid electrolytic capacitor shown in FIG. 1A.
Figure 1C:
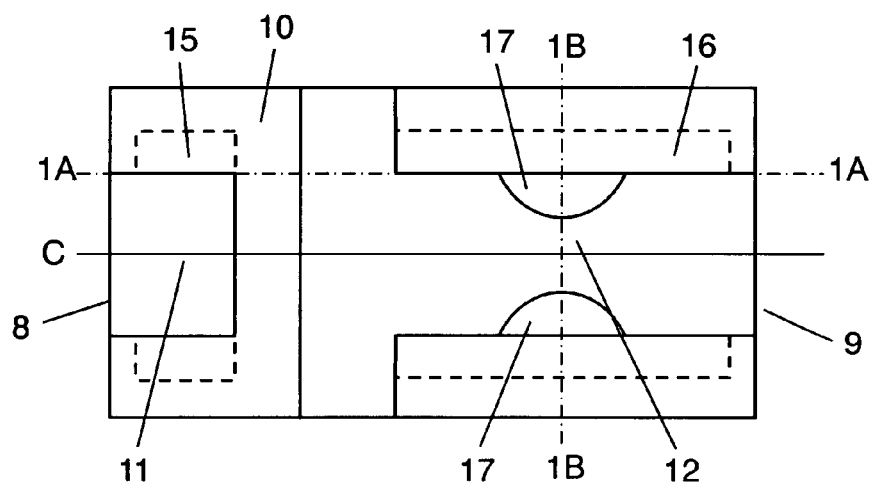
FIG. 1C is a bottom view of the solid electrolytic capacitor shown in FIG. 1A.

FIG. 1A is a sectional side view of a solid electrolytic capacitor according to an exemplary embodiment of the present invention, FIG. 1B is a sectional front view thereof, and FIG. 1C is a bottom view of the same. FIG. 1A shows a sectional view taken along line 1A-1A of FIG. 1C, and FIG. 1B shows a sectional view taken along line 1B-1B of FIG. 1C.

Capacitor element 1 includes anode body 2, anode leader 3, insulator layer 4, dielectric oxide film 5, solid electrolyte 6, and cathode layer 7. Anode body 2 is formed of a valve metal foil. Insulator layer 4 divides anode body 2 into an anode portion and a cathode portion. Anode leader 3 is provided at one end which is the anode portion of anode body 2, and dielectric oxide film 5 is formed on the surface of the other end which is the cathode portion of anode body 2. Solid electrolyte 6 made of a conductive polymer is provided on dielectric oxide film 5. In cathode layer 7, a carbon layer is laminated on solid electrolyte 6, and a silver paste layer is laminated on the carbon layer.

Anode body 2 is made of a valve metal such as aluminum, tantalum, niobium, and titanium, and a portion where dielectric oxide film 5 is formed may be made of a porous sintered material including valve metal powders. Solid electrolyte 6 is made of a conductive polymer such as polypyrrole, polythiophene, and polyaniline. Alternatively, solid electrolyte 6 may be made of manganese oxides such as manganese dioxide. Anode terminal 8 and cathode terminal 9 are formed of metal materials which are made by machining plate-shape lead frames. Outer casing resin 10 is made of an insulating resin such as an epoxy resin. A lower surface of outer casing resin 10 becomes mounting surface 21.

Anode terminal 8 is electrically coupled with anode leader 3, and cathode terminal 9 is electrically coupled with cathode layer 7. Anode terminal 8 and cathode terminal 9 are drawn immediately below capacitor element 1, and each of anode terminal 8 and cathode terminal 9 constitutes a part of mounting surface 21. That is, flat portion 11 is provided in anode terminal 8 while exposed from outer casing resin 10, and flat portion 11 is arranged in a same plane with mounting surface 21. Flat portion 12 is provided in cathode terminal 9 while exposed from outer casing resin 10, and flat portion 12 is arranged in a same plane with mounting surface 21. Flat portion 11 is formed in a rectangular shape, and flat portion 12 is formed in a T-shape. Flat portion 12 is provided close onto a side of flat portion 11 while going beyond a central portion of mounting surface 21 from an end portion of mounting surface 21. Flat portions 11 and 12 on mounting surface 21 have symmetrical shapes with respect to a C-axis which is of a direction connecting flat portion 11 and flat portion 12.

Leading portions 13 are provided in both end portions of anode terminal 8 in a direction which is not a thickness direction while being orthogonal to the C-axis. Leading portions 13 are obliquely raised from flat portion 11 so as to be separated from each other. Similarly, leading portions 14 are provided in both end portions of cathode terminal 9 in a direction which is not a thickness direction while being orthogonal to the C-axis. Leading portions 14 are obliquely raised from flat portion 12 so as to be separated from each other. As shown in FIG. 1B, inclination angles θ1 are formed by leading portions 13 and 14 and flat portions 11 and 12 respectively. The inclination angle θ1 ranges from 30° to 60°.

Flat placement portions 15 and 16 are provided in upper surfaces of leading portions 13 and 14, and placement portions 15 and 16 are coupled with lower surfaces of anode leader 3 and cathode layer 7, respectively. There are steps ranging from 0.1 to 0.15 mm between placement portions 15 and 16 and flat portions 11 and 12 respectively. Placement portions 15 and 16 and flat portions 11 and 12 are coupled by leading portion 13 and 14, respectively. That is, each of placement portions 15 and flat portion 11 are formed in a stepwise shape, and each of placement portions 16 and flat portion 12 are formed in the stepwise shape.

Recesses 17 are provided on the side of mounting surface 21 of cathode terminal 9 while exposed onto the side of mounting surface 21. Recesses 17 are provided in both sides of a longitudinal rod portion of T-shape cathode terminal 9. One side of recess 17 is formed by wall surface 18 of cathode terminal 9, and wall surface 18 made of the metal is obliquely raised from flat portion 12. The other side is formed by wall surface 19 of outer casing resin 10. The whole of wall surface 18 is curved so as to be swelled toward the direction opposite mounting surface 21, and the whole of wall surface 18 is formed by an arc in which an angle φ1 ranges from 10° to 90° in a cross section on line 1B-1B. On the other hand, wall surface 19 is substantially perpendicular to mounting surface 21. As shown in FIG. 1C, an opening intersecting mounting surface 21 of recess 17 has a shape in which an ellipse is cut into halves in parallel with the center line, and surroundings of the opening are closed.

In comparison of an area projected onto mounting surface 21, the area of cathode terminal 9 is 2 to 6 times larger than the area of cathode terminal 9. In flat portion 11 of anode terminal 8, a tin metal layer (not shown) is formed in the surface on the side of mounting surface 21. Also in flat portion 12 of cathode terminal 9, the tin metal layer (not shown) is formed in the surface on the side of mounting surface 21, where recess 17 is exposed. A tin plating layer whose thickness ranges, for example, from 3 to 10 μm is formed by metal plating, and is melted by a laser so as to be solidified to form the tin metal layer.

Hereinafter, a method of producing the solid electrolytic capacitor of the present embodiment will be described. The surface of rectangular aluminum foil having the thickness of 100 μm as anode body 2 is roughened by an electrochemically etching process. The processed foil is anodized by voltage application in an aqueous ammonium adipate solution to form an aluminum oxide layer as dielectric oxide film 5.

Then, insulator layer 4 is formed by a polyimide adhesion tape, and one end of anode body 2 is dipped in a manganese nitrate solution. The one end of anode body 2 is divided to become the cathode portion by insulator layer 4. Then, the manganese nitrate is thermally decomposed to make a manganese oxide layer which becomes a part of solid electrolyte 6. Thereafter, the manganese oxide layer is dipped in a mixture solution containing pyrrole monomer and sodium propyl-naphthalene sulfonate, and electrolytic oxidative polymerization is performed to form solid electrolyte 6 made of polypyrrole.

The cathode portion side is dipped in a colloidal carbon suspending solution to apply it onto solid electrolyte 6, and the suspending solution is dried to form the carbon layer. After a silver paste is applied onto the cathode portion side, the silver paste is cured to form the silver paste layer on the carbon layer, and thereby cathode layer 7 including the carbon layer and the silver paste layer is formed. Thus, capacitor element 1 is produced.

Figure 2:
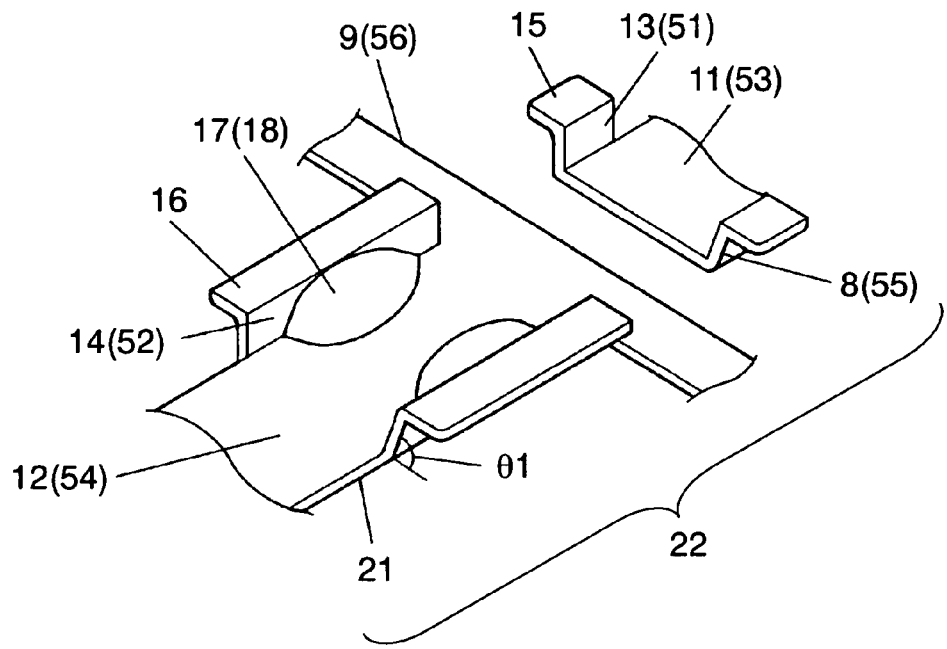
FIG. 2 is a perspective view showing a main part of a lead frame, in which a recess is formed, of the solid electrolytic capacitor shown in FIG. 1A.

FIG. 2 is a perspective view showing a main part of a lead frame, in which recess 17 shown in FIGS. 1A to 1C is formed. Lead frame 22 is formed by a belt-shape metal member having the thickness of 0.1 mm. The metal member is made of copper or a copper alloy. A nickel underlaying plating layer and a tin plating layer on the nickel layer are formed in one surface of the metal member. The surface of the metal member becomes the side of mounting surface 21. The metal member is punched to provide plural pairs of punched portions 55 and 56 which become anode terminal 8 and cathode terminal 9. The pairs of punched portions 55 and 56 are provided at constant intervals. Thus, lead frame 22 is produced.

Bending portions 51 and 52 and placement portions 15 and 16 are provided in punched lead frame 22 by press metallic dies. Bending portions 51 and 52 become leading portions 13 and 14, and placement portions 15 and 16 are formed in the stepwise shape on bending portions 51 and 52. Bending portions 51 are bent from both ends of flat lower surface 53 of lead frame 22 which becomes flat portion 11 of anode terminal 8, and bending portions 51 are bent obliquely upward at an inclination angle θ1 with respect to lower surface 53 so as to be separated from each other. Similarly, bending portions 52 are bent from both ends of flat lower surface 54 of lead frame 22 which becomes flat portion 12 of cathode terminal 9, and bending portions 52 are bent obliquely upward at an inclination angle θ1 with respect to lower surface 54 so as to be separated from each other.

Using the press dies, parts of lower surface 54 and bending portions 52 are raised and bent so as to be swelled toward the direction opposite lower surface 54, and thereby wall surfaces 18 each which becomes a part of recess 17 are formed. Then, as shown in FIG. 1B, paste conductive bonding agent 27 is applied on surfaces of placement portions 16, lower surface 54, and wall surfaces 18 to bond cathode layer 7 to punched portion 56. Placement portions 15 of punched portion 55 and anode leader 3 are coupled with each other by laser welding. Thus, capacitor element 1 is coupled with lead frame 22.

Then, an upper die and a lower die are prepared. A cavity is provided in the upper die, and the cavity accommodates capacitor element 1, placement portions 15 and 16, bending portions 51 and 52, and wall surfaces 18. The lower die comes into contact with flat portions 11 and 12. Lead frame 22 is clamped with the upper and lower dies, and outer casing resin 10 is formed with the epoxy resin by transfer molding. Therefore, outer casing resin 10 is formed so as to cover capacitor element 1, placement portions 15 and 16, leading portions 13 and 14, and wall surfaces 18, and to expose flat portions 11 and 12.

Outer casing resin 10 includes a curing body of epoxy resin and inorganic particles dispersed in the curing body. For example, the curing body is made of dicyclopentadiene type epoxy resin as a main-skeleton and a phenolic novolac resin. The inorganic particles is made of, for example, silica having an average grain size of 60 μm to 80 μm, and the curing body contains the inorganic particles at 80% to 90% in terms of mass.

Figure 3:
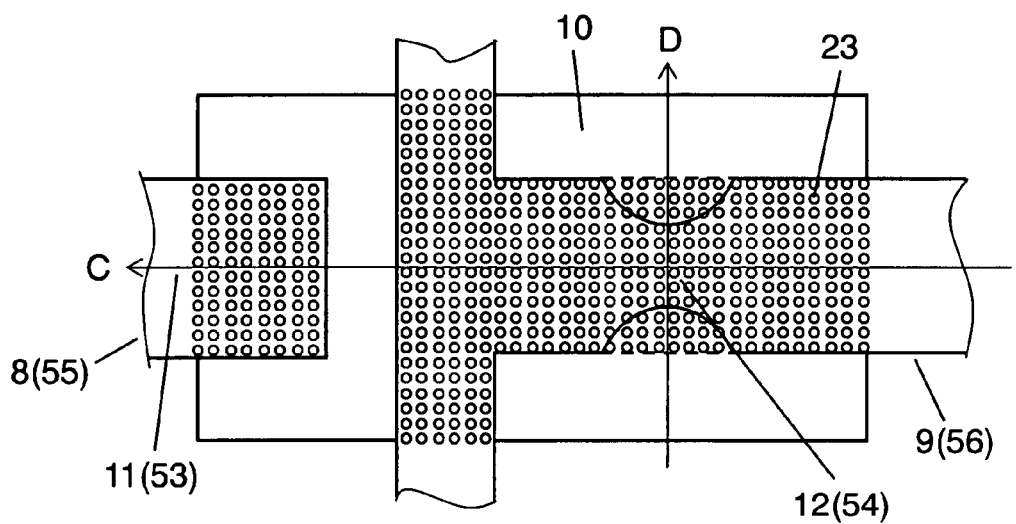
FIG. 3 is a schematic view showing laser irradiation points in a mounting surface of the solid electrolytic capacitor shown in FIG. 1A after an outer casing resin is formed.

Then, portions of outer casing resin 10 are removed to expose wall surfaces 18 by a laser apparatus. FIG. 3 is a schematic view showing laser irradiation points 23 in mounting surface 21 after outer casing resin 10 is formed.

For example, YAG (Yttrium aluminum garnet) laser is used as the laser apparatus, first laser irradiation is performed while laser irradiation energy is set in a range of 20 J to 40 J.

As shown in FIG. 3, in the first laser irradiation, lower surfaces 53 and 54 and the surface of the portions of outer casing resin 10 are irradiated with the laser at laser irradiation points 23. Lower surfaces 53 and 54 correspond to flat portions 11 and 12 exposed to mounting surface 21, and the portions of outer casing resin 10 cover wall surfaces 18. Distances between laser irradiation points 23 are 0.1 mm in both the C-axis direction and the D-axis direction orthogonal to the C-axis. After the laser is scanned along the D-axis direction, laser scanning positions are sequentially moved along the C-axis direction. The portions of outer casing resin 10 on wall surfaces 18 are removed by the first laser irradiation, and recesses 17 each whose one side becomes wall surface 19 composed of outer casing resin 10 are formed in punched portion 56 which becomes cathode terminal 9. In lower surfaces 53 and 54 of punched portions 55 and 56, the tin plating layer is melted and solidified so as to be raised around laser irradiation point 23 having a diameter of about 0.1 mm.

Then, using the same laser apparatus, second laser irradiation is performed on the same conditions as the first laser irradiation. The second laser irradiation removes dirt on wall surfaces 18. As with lower surfaces 53 and 54, the second laser irradiation melts and solidifies the tin plating layer on wall surfaces 18 such that the tin plating layer is raised around laser irradiation point 23 having the diameter of about 0.1 mm.

Finally, lead frame 22 is cut to form pieces of the solid electrolytic capacitor. Lead frame 22 is cut at portions which are connected to lower surface 53 or lower surface 54 and extended toward outside planes from mounting surface 21 of outer casing resin 10.

Thus, in the present embodiment, after outer casing resin 10 is formed such that wall surfaces 18 coupled to flat portion 12 are covered while lower surface 54 corresponding to flat portion 12 is exposed, the portions of outer casing resin 10 is removed to expose wall surfaces 18. Therefore, a variation in machining dimension of wall surfaces 18 has no influence on a variation in exposure of flat portion 12, so that flat portion 12 can accurately be arranged in a same plane with mounting surface 21. This ensures flatness of mounting surface 21 and improves the mounting property.

The portions of outer casing resin 10 which cover wall surfaces 18 are carbonized and removed by the laser irradiation. Therefore, even if the variation is generated in the machining dimension of wall surfaces 18, recesses 17 each surrounded by wall surface 18 and wall surface 19 can securely be formed. Additionally, recesses 17 having excellent solder wetting properties can securely be formed.

Figure 4:
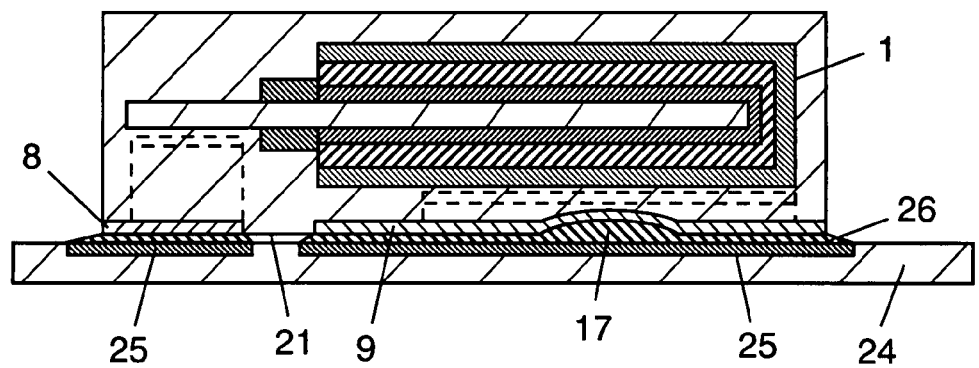
FIG. 4 is a sectional view showing a state in which the solid electrolytic capacitor shown in FIG. 1A is mounted on a circuit board.

Hereinafter, a method of attaching the solid electrolytic capacitor of the present embodiment to a circuit board will be described. FIG. 4 is a sectional view showing the state in which the solid electrolytic capacitor of the present embodiment is mounted on a circuit board. Lands 25 are provided on circuit board 24. Lands 25 correspond to positions of anode terminal 8 and cathode terminal 9 which are exposed onto the side of mounting surface 21, and lands 25 have shapes substantially similar to those of the terminals. Lands 25 are slightly larger than the terminals. After the solder cream is applied onto lands 25, the solid electrolytic capacitor of the present embodiment is placed on the lands 25, and the solder is melted by high-temperature reflow to attach the solid electrolytic capacitor to circuit board 24.

In the solid electrolytic capacitor of the present embodiment, recesses 17 are provided on cathode terminal 9. Therefore, the melted solder in mounting the solid electrolytic capacitor onto the circuit board 24 is accommodated in recesses 17, and the thicknesses of soldering layers 26 becomes substantially equal to each other in anode terminal 8 and cathode terminal 9. As a result, the mounting property is improved, and the solid electrolytic capacitor can be mounted while the high-frequency properties are improved.

Recesses 17 are preferably formed while bent so as to be swelled toward the direction in which recesses 17 are separated away from mounting surface 21. Therefore, in a process during which the melted solder is wetting the metal surfaces of recesses 17, swelling of the solder generated toward outer casing resin 10 by surface tension of the solder is particularly decreased in a deep portion of recesses 17. That is, the swelling of the solder generated by surface tension of the solder can be decreased, which hardly includes a bubble to form soldering layer 26 over recesses 17.

Recesses 17 are preferably provided at two points so as to face each other with respect to the C-axis as a first axis connecting anode terminal 8 and cathode terminal 9. When the solder is formed in recesses 17, the surface tensions generated at both end portions intersecting the D-axis of FIG. 3 in cathode terminal 9 act so as to cancel each other. Therefore, the solid electrolytic capacitor is prevented from being inclined or floating, and the mounting property is further improved. In FIGS. 1C and 3, recesses 17 are provided at two points so as to face each other with respect to C-axis. Alternatively, recesses 17 may be provided at two points so as to face each other with respect to the D-axis as a second axis orthogonal to the C-axis.

It is preferable to form leading portions 14 while bent obliquely upward from flat portion 12, and to form wall surfaces 18 in the inclined surfaces of leading portions 14. Thus, the inclined surfaces of leading portions 14 are exposed as wall surfaces 18, so as to allow the soldering to be performed from mounting surface 21 to leading portions 14. Therefore, connection resistance is decreased from mounting surface 21 to capacitor element 1, so as to further improve the high-frequency properties.

It is preferable to form leading portions 14 while bent obliquely upward from flat portion 12, and to form wall surfaces 18 by raising cathode terminal 9 so as to couple to the inclined surfaces of leading portions 14 and flat portion 12. Thereby, when cathode layer 7 and cathode terminal 9 are coupled with each other, deformation of leading portions 14 can be suppressed. That is, although physical stress may be generated by the deformation of leading portion 14, the physical stress on capacitor element 1 can be reduced so as to decrease leak current of capacitor element 1.

Because the leading distance to capacitor element 1 can be shortened by increasing the contacting area of recesses 17 and lands 25, the high-frequency properties is improved.

Wall surfaces 19 each which is of a part of wall surface in recess 17 is preferably formed by outer casing resin 10. Thereby, thanks to outer casing resin 10 in which the solder leakage is not generated, the melted solder generated at both end portions intersecting the D-axis acts so as to be correctly aligned with a patterns of a circuit board in mounting surface 21. Accordingly, the solid electrolytic capacitor is prevented from being inclined or floating, and the mounting property is further improved.

The each surface of the metal members of recesses 17 is preferably melted by the laser irradiation after recesses 17 are exposed. In order to secure soldering properties, the metal layer made of Sn, an alloy of Sn and Ag, Pb, Bi, In, or Cu, silver, or gold is formed in the each surface of the metal members of recesses 17 by plating or evaporation. The metal layer surface is melted and solidified by the laser irradiation, so as to decrease the oxidation film. As a result, the metal layer is densified to enhance the solder wetting properties in the surfaces of recesses 17.

Particularly, in the plating layer formed via electrolytic plating or nonelectrolytic plating, the deposited particles are collected together while having grain boundaries therebetween, and the thickness of the plating layer ranges from 1 $\mu$m to 20 $\mu$m. The plating layer is melted by the laser irradiation, and the melted plating layer is rapidly solidified, which eliminates the grain boundary to form the dense metal layer. The metal layer melted and solidified by the laser irradiation is formed over the surfaces of the anode terminal and cathode terminal so as to allow the solder wetting property to be further enhanced.

The laser irradiation is preferably scanned so as to correspond to at least one of anode terminal 8 and cathode terminal 9 which are exposed on mounting surface 21. Thereby, using the one laser apparatus, the surfaces of flat portions 11 and 12 can continuously be melted and outer casing resin 10 can be removed on recesses 17 while irradiation energy is kept constant.

The metal layer on the surfaces of recesses 17 can be melted by performing the laser irradiation plural times, and thereby the solder wetting properties are enhanced on the surfaces of flat portion 12 and recesses 17. In the plural-time laser irradiation, the same irradiation points may be irradiated in each laser scan, or the different irradiation points may be irradiated in each laser scan. When the different irradiation points are irradiated in each laser scan, the uniform thickness can be achieved in the melted metal layer to further improve the solder wetting property.

Although the YAG laser is used in the present embodiment, a $CO_2$ laser and an excimer laser can be used. However, the YAG laser has the irradiation energy enough to be able to remove outer casing resin 10, and the YAG laser has good focusing properties to machine a detail portion. Therefore, the YAG laser is desirably used.

Figure 5A:
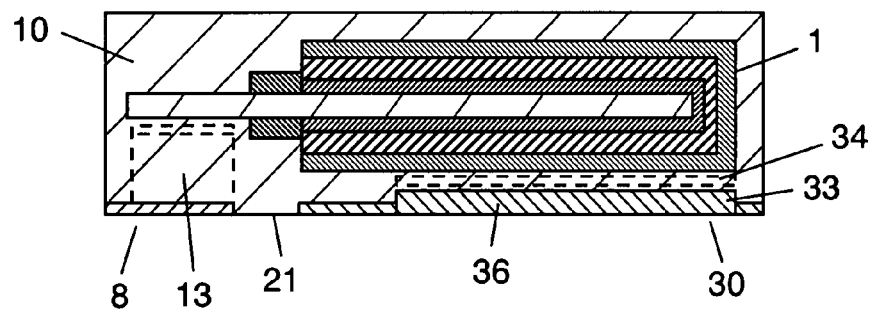
FIG. 5A is a side sectional view of another solid electrolytic capacitor according to the exemplary embodiment of the present invention.
Figure 5B:
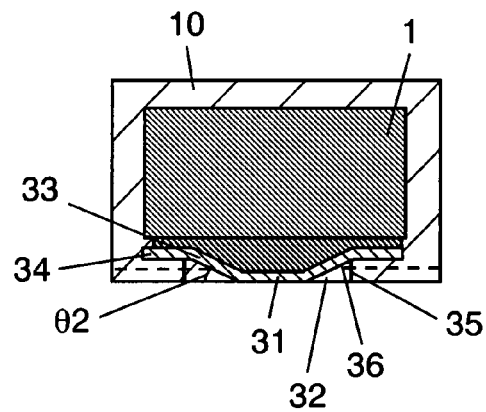
FIG. 5B is a front sectional view of the solid electrolytic capacitor shown in FIG. 5A.
Figure 5C:
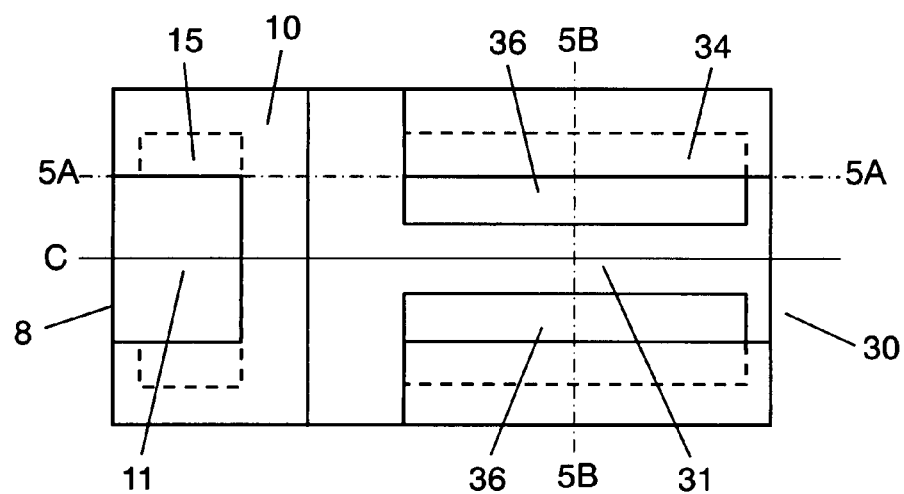
FIG. 5C is a bottom view of the solid electrolytic capacitor shown in FIG. 5A.

Hereinafter, a solid electrolytic capacitor having a cathode terminal provided with different recesses will be described below. FIG. 5A is a sectional side view of another solid electrolytic capacitor according to the exemplary embodiment of the present invention, FIG. 5B is a sectional front view thereof, and FIG. 5C is a bottom view thereof. FIG. 5A shows a sectional view taken along line 5A-5A of FIG. 5C, and FIG. 5B shows a sectional view taken along line 5B-5B of FIG. 5C.

Cathode terminal 30 is made of the metal member which is made by machining a lead frame. Flat portion 31 is provided in a lower surface as mounting surface 21, and flat portion 31 is arranged in a same plane with mounting surface 21 while exposed from outer casing resin 10. Cathode terminal 30 has a T-shape in mounting surface 21, and cathode terminal 30 is provided close onto the side of anode terminal 8 while going beyond the central portion of the lower surface from the end portion of mounting surface 21.

Leading portions 33 are provided both end portions of the longitudinal rod portion in T-shaped cathode terminal 30, and leading portions 33 have inclined wall surfaces 32 made of metal. Placement portions 34 are provided in the upper portions of leading portions 33. Using press dies, leading portions 33 are bent obliquely upward at inclination angles θ2 ranging from 5 to 45° with respect to flat portion 31 so as to be separated from the flat lower surface of the lead frame. Flat portion 31 and each of placement portions 34 are formed in the stepwise shape while having a step ranging from 0.1 to 0.15 mm.

In producing the solid electrolytic capacitor mentioned above, capacitor element 1 is connected to the lead frame, outer casing resin 10 is formed, and wall surfaces 32 are exposed by the laser irradiation like FIG. 3. Then, recess 36 is formed. In recess 36, the surroundings of the rectangular opening intersecting mounting surface 21 are closed. That is, one of the side faces of each recess 36 is formed by wall surface 32, and the other side face is formed by wall surface 35 of the outer casing resin. Wall surface 35 is provided in the direction substantially perpendicular to mounting surface 21.

In mounting the solid electrolytic capacitor of this structure, the melted solder is accommodated in recesses 36, and the soldering layer on anode terminal 8 is substantially equal to that on cathode terminal 30 in thickness. That is, the same effect as the solid electrolytic capacitor shown in FIGS. 1A to 1C is obtained.

Figure 6A:
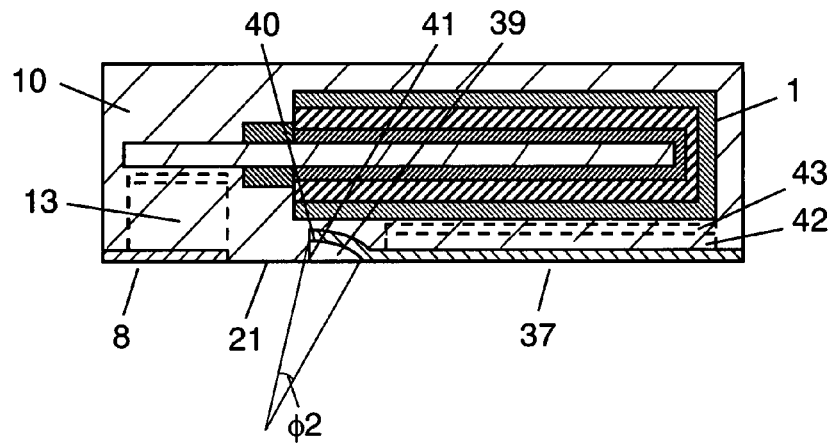
FIG. 6A is a side sectional view of a still other solid electrolytic capacitor according to the exemplary embodiment of the present invention.
Figure 6B:
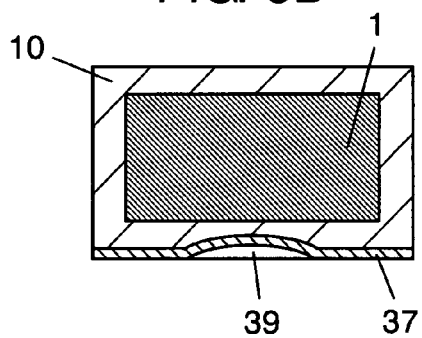
FIG. 6B is a front sectional view of the solid electrolytic capacitor shown in FIG. 6A.
Figure 6C:
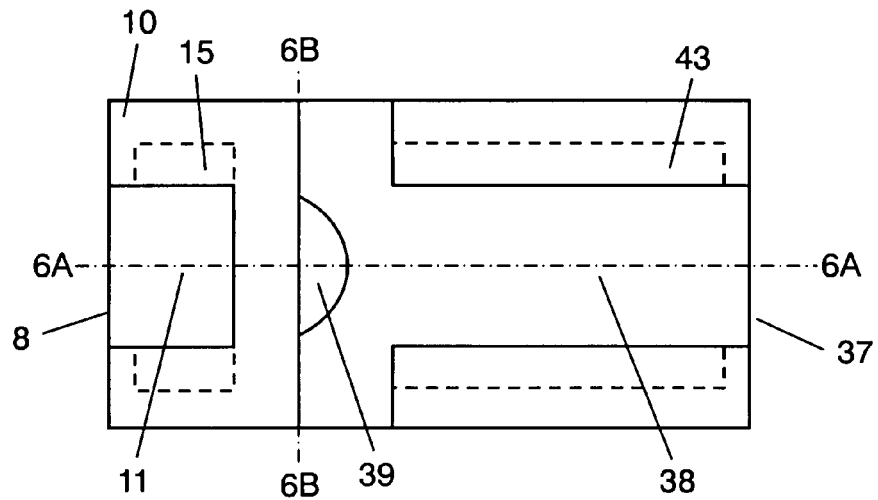
FIG. 6C is a bottom view of the solid electrolytic capacitor shown in FIG. 6A.
Figure 7A:
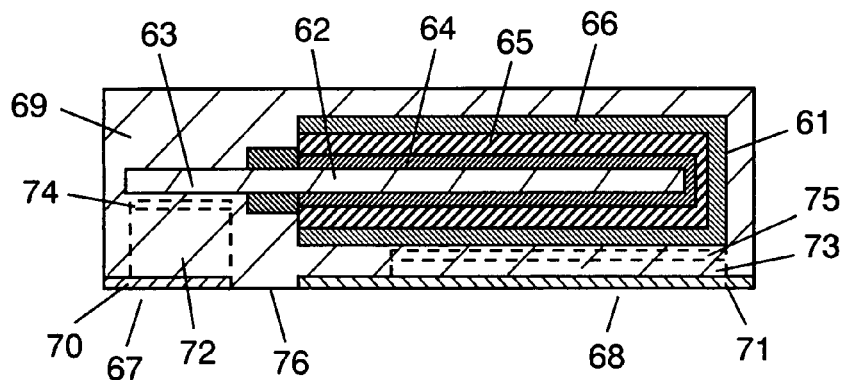
FIG. 7A is a side sectional view showing a conventional solid electrolytic capacitor.
Figure 7B:
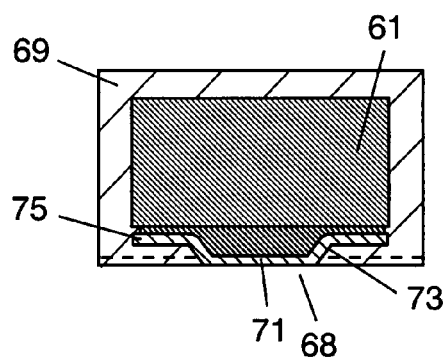
FIG. 7B is a front sectional view of the solid electrolytic capacitor shown in FIG. 7A.
Figure 7C:
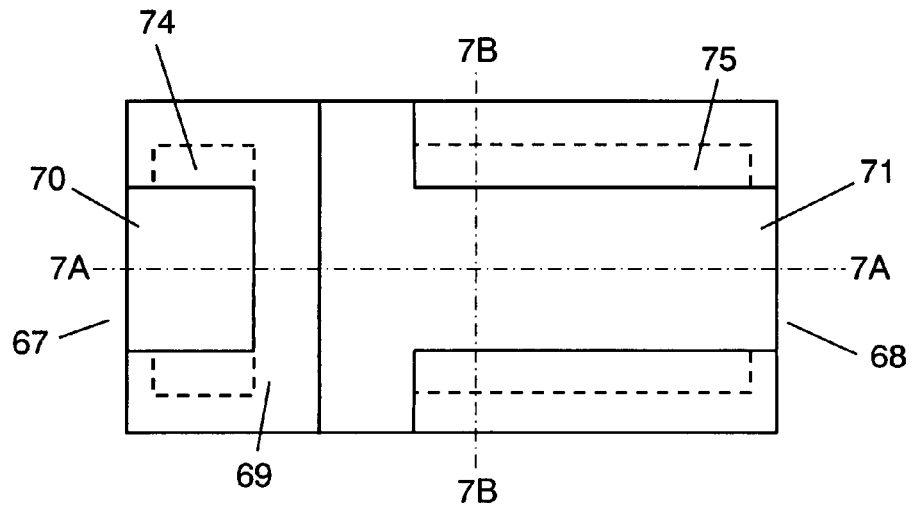
FIG. 7C is a bottom view of the solid electrolytic capacitor shown in FIG. 7A.
Figure 8:
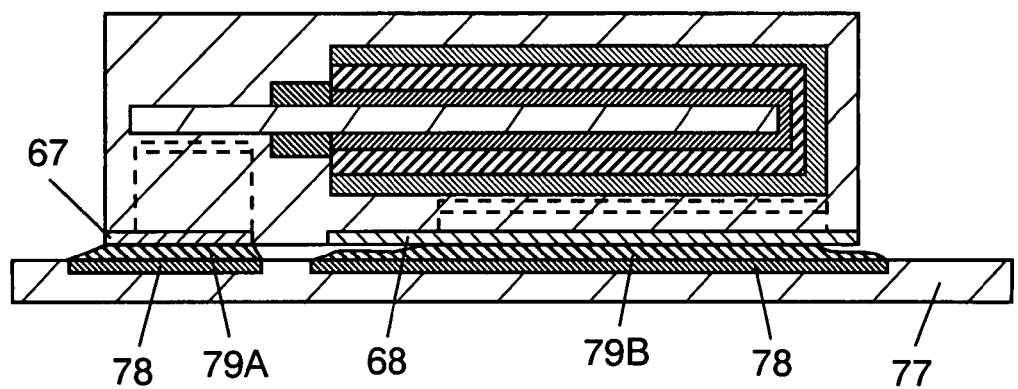
FIG. 8 is a sectional view showing a mounted state of the solid electrolytic capacitor of FIG. 7A.

Hereinafter, a solid electrolytic capacitor having a cathode terminal with a recess different from that of the solid electrolytic capacitor shown in FIGS. 5A to 5C will be described below. FIG. 6A is a sectional side view of a still other solid electrolytic capacitor according to the exemplary embodiment of the present invention, FIG. 6B is a sectional front view thereof, and FIG. 6C is a bottom view thereof. FIG. 6A shows a sectional view taken along line 6A-6A of FIG. 6C, and FIG. 6B shows a sectional view taken along line 6B-6B of FIG. 6C.

Cathode terminal 37 is made of the metal member which is made by machining a lead frame. Flat portion 38 is provided in a lower surface as mounting surface 21, and flat portion 38 is arranged in a same plane with mounting surface 21 while exposed from outer casing resin 10. Cathode terminal 37 has a T-shape in mounting surface 21, and cathode terminal 37 is provided close onto the side of anode terminal 8 while going beyond the central portion of the lower surface from the end portion of mounting surface 21.

On the side of mounting surface 21 of cathode terminal 37, recess 39 is provided in an edge of the short rod portion in T-shaped cathode terminal 37, which intersects the C-axis and is located adjacent to anode terminal 8. One side face of recess 39 is formed by wall surface 40 made of metal, and wall surface 40 is raised obliquely upward from flat portion 38. The other side face is formed by wall surface 41 of outer casing resin 10, and wall surface 41 is located adjacent to anode terminal 8.

Using press dies, wall surface 40 is formed by curving the whole surface such that the flat lower surface of the lead frame is swelled toward the direction opposite mounting surface 21. As shown in FIG. 6A, the cross section of wall surface 40 is formed in the arc in which an angle φ2 ranges from 10° to 90°. Wall surface 40 is arranged in the direction substantially perpendicular to mounting surface 21.

Leading portions 42 are obliquely provided in both end portions of cathode terminal 37 in a direction which is orthogonal to line 6A to 6A and not a thickness direction. Placement portions 43 are provided on the upper side of leading portions 42 while having steps respectively. After metal wall surface 40 is formed in the lead frame, using press dies, leading portions 42 are bent obliquely upward at inclination angles ranging from 30° to 60° so as to be separated from the flat lower surface of the lead frame.

After the lead frame is bent, like FIG. 1A, capacitor element 1 is connected to the lead frame and outer casing resin 10 is formed. Finally, wall surface 40 is exposed by the laser irradiation, and recess 39 is formed while surrounded by wall surface 40 and wall surface 41.

In mounting the solid electrolytic capacitor of this structure, the melted solder is accommodated in recess 39, and the soldering layer on anode terminal 8 is substantially equal to that on cathode terminal 37 in thickness. That is, the same effect as the solid electrolytic capacitor shown in FIGS. 1A to 1C is obtained.

In the above embodiment, recesses 17, 36, and 39 are provided in cathode terminals 9, 30, and 37, respectively. That is, recesses 17, 36, and 39 are provided on the side of mounting surface 21 of cathode terminals 9, 30, and 37, where the areas projected onto mounting surface 21 of cathode terminals 9, 30, and 37 are larger than that of anode terminal 8. In addition, when the area projected onto mounting surface of the anode and cathode terminals is large, one of or both the anode and cathode terminals may be provided so as to have at least one recess having the large capacity. In the above embodiment, the anode and cathode terminals are formed by the lead frames. However, the invention is not limited thereto. For example, the anode and cathode terminals may be formed by metal pieces in which a metal rod is cut.

As described above, according to the exemplary embodiment of the present invention, can produce solid electrolytic capacitors having excellent high-frequency properties and improved mounting property. That is, the solid electrolytic capacitor according to the present invention and the manufacturing method thereof can be applied to surface-mount type solid electrolytic capacitors in which the low-ESR and low ESL properties are required.

What is claimed is:

1. A solid electrolytic capacitor comprising:
   a capacitor element including:
      an anode body made of a valve metal, and having an anode leader provided at one end thereof;
      a dielectric oxide film formed on a surface of the anode body on a side opposite a side on which the anode leader is provided;
      a solid electrolyte formed on the dielectric oxide film; and
      a cathode layer formed on the solid electrolyte;
   an anode terminal electrically coupled with the anode leader, the anode terminal being drawn immediately below the capacitor element to constitute a part of a mounting surface;
   a cathode terminal electrically coupled with the cathode layer, the cathode terminal being drawn immediately below the capacitor element to constitute a part of the mounting surface; and
   an outer casing resin covering the capacitor element so as to expose the anode terminal and the cathode terminal on the mounting surface;
   wherein one of the anode terminal and the cathode terminal has an area projected onto the mounting surface that is larger than an area of the other of the anode terminal and the cathode terminal projected onto the mounting surface;
   wherein at least said one of the anode terminal and the cathode terminal that has the larger area projected onto the mounting surface is provided on the mounting surface side with at least one recess; and wherein parts of a metal wall surface of said at least one recess are exposed from said outer casing resin, and raised spots are formed by laser irradiation on the parts of the metal wall surface of said at least one recess that are exposed from said outer casing resin.

2. The solid electrolytic capacitor according to claim 1, wherein a part of a wall surface of the at least one recess is made of the outer casing resin.

3. The solid electrolytic capacitor according to claim 1, wherein the at least one recess is formed while bent so as to be swelled toward a direction in which the at least one recess is separated away from the mounting surface.

4. The solid electrolytic capacitor according to claim 1, wherein said at least one recess comprises two recesses provided at two points so as to face each other with respect to one of a first axis and a second axis, the first axis connecting the anode terminal and the cathode terminal, the second axis being orthogonal to the first axis.

5. The solid electrolytic capacitor according to claim 1, wherein at least one of the anode terminal and cathode terminal in which the at least one recess is provided includes:
   a flat portion constituting a part of the mounting surface; and
   a leading portion bent obliquely upward from the flat portion, and
   wherein the at least one recess is formed in an inclined surface of the leading portion.

6. The solid electrolytic capacitor according to claim 1, wherein at least one of the anode terminal and cathode terminal in which the at least one recess is provided includes:
   a flat portion constituting a part of the mounting surface; and
   a leading portion bent obliquely upward from the flat portion, and
   wherein the at least one recess is formed so as to be coupled to an inclined surface of the leading portion and the flat portion.

7. A manufacturing method of a solid electrolytic capacitor, the method comprising:
   producing a capacitor element by laminating sequentially a dielectric oxide film, a solid electrolyte, and a cathode layer on a surface of an anode body made of a valve metal, the anode body including an anode leader;
   producing an anode terminal by using a metal member, the anode terminal being configured to be electrically coupled with the anode leader, and to be drawn immediately below the capacitor element to constitute a part of a mounting surface;
   producing a cathode terminal using a metal member, the cathode terminal being configured to be electrically coupled with the cathode layer, and to be drawn immediately below the capacitor element to constitute a part of the mounting surface; and
   covering the capacitor element with an outer casing resin such that the anode terminal and the cathode terminal are exposed on the mounting surface;
   wherein said producing of the anode terminal and said producing of the cathode terminal are carried out so that one of the anode terminal and the cathode terminal has an area projected onto the mounting surface that is larger than an area of the other of the anode terminal and the cathode terminal projected onto the mounting surface;
   wherein said producing of the anode terminal and said producing of the cathode terminal are carried out so that at least said one of the anode terminal and the cathode terminal that has the larger area projected onto the mounting surface is provided on the mounting surface side with at least one recess; and
   wherein a part of the outer casing resin is removed by first laser irradiation to expose a metal wall surface of the recess, and the metal wall surface in the recess is further melted by second laser irradiation after the recess is exposed by the first laser irradiation.

8. The manufacturing method of a solid electrolytic capacitor according to claim 7, wherein, in said covering of the capacitor element, the outer casing resin is arranged such that a part of a wall surface of the recess is made of the outer casing resin.

9. The manufacturing method of a solid electrolytic capacitor according to claim 7, wherein the recess is bent so as to be swelled toward a direction in which the recess is separated away from the mounting surface.

10. The manufacturing method of a solid electrolytic capacitor according to claim 7, wherein two recesses are provided at two points so as to face each other with respect to one of a first axis and a second axis, the first axis connecting the anode terminal and the cathode terminal, the second axis being orthogonal to the first axis.

11. The manufacturing method of a solid electrolytic capacitor according to claim 7, wherein the first laser irradiation is scanned so as to correspond to at least one of the anode terminal and cathode terminal that are exposed on the mounting surface.

* * * * *